United States Patent [19]
Kloos

[11] 3,821,155
[45] June 28, 1974

[54] FIRE RETARDANT MULTICOLORED COATING COMPOSITION
[75] Inventor: Albert Kloos, Colonia, N.J.
[73] Assignee: Celanese Coatings & Specialties Company, New York, N.Y.
[22] Filed: Dec. 22, 1970
[21] Appl. No.: 100,788

[52] U.S. Cl......... 260/37 EP, 117/100 S, 260/22 R, 260/28, 260/37 N, 260/40 R
[51] Int. Cl............................................. C08g 51/04
[58] Field of Search............... 260/37 EP; 167/100 S

[56] References Cited
UNITED STATES PATENTS
2,829,982  4/1958  Hoyt......................... 260/37 EP UX
2,987,496  6/1961  Simpson................... 260/37 EP UX
3,099,574  7/1963  Bernier........................... 117/100 S
3,501,436  3/1970  Avis et al........................ 260/37 EP OTHER PUBLICATIONS
Lee et al.; Handbook of Epoxy Resins; McGraw-Hill Book Co.; 1967; pages 2–13 and 2–14 Sci. Lib., TP 1180.E6 L4.

*Primary Examiner*—Lewis T. Jacobs
*Attorney, Agent, or Firm*—Thomas J. Morgan; Herbert P. Price

[57] ABSTRACT

Fire retardant multicolored coating compositions, useful on ship decks, industrial floors and the like, are made from multicolored coated sand and a clear binder wherein the colored coating on the sand contains antimony trioxide and pigment containing organically bound halogen.

4 Claims, No Drawings

FIRE RETARDANT MULTICOLORED COATING COMPOSITION

BACKGROUND OF THE INVENTION

This invention is directed to coating or plastic compositions containing a fire proofing agent.

Multicolored coating compositions are generally made by incorporating colored aggregate into a clear film forming binder. Such coatings have found utility as seamless flooring compositions and in decorative paneling of various types. Even though the amount of organic material in such coatings is low, the coatings will still ignite when subjected to a flame of sufficient heat and will continue to burn after the flame has been removed. A common method for imparting fire retardant and self extinguishing properties to coatings is adding antimony trioxide and halogenated compounds to the formulation as described by Birbaum and Markowitz, 40 Industrial & Engineering Chemistry 400 (1948). However, antimony trioxide is a pigment and is opaque in coating formulation. When antimony trioxide is added as a pigment to formulations of colored aggregate and clear binder, multicolored effects are damaged or destroyed and the esthetic appeal of the coatings is diminished. Furthermore, a considerable number of resinous halogen containing compounds are insoluble in the clear binders commonly used in seamless flooring composition and cannot be used without harming the esthetic and physical properties of the coatings.

SUMMARY OF THE INVENTION

This invention pertains to a fire retardant coating composition. In another aspect this invention relates to a color-coated sand capable of imparting fire retardant properties to multicolored coatings. In particular, this invention is directed to a fire retardant, multicolored coating composition containing color-coated sand aggregate. More particularly, this invention pertains to a colored aggregate, floor-coating composition to which is imparted fire retardant properties while retaining the multicolored effects of the colored aggregates.

This invention involves, first, preparation of color-coated sand wherein sand is coated with a curable composition, without agglomerating the sand and while retaining its free-flowing characteristics. The curable composition is made from a mixture of epoxy resin, epoxy resin curing agent, antimony trioxide, other colored pigments, and alternatively, a halogen containing compound. After the coating on the sand is cured, the sand is used as a colored aggregate in surface coating compositions by simply blending it with a thermosetting, generally room temperature curable, binder, and applying the blend to the desired substrate. The preferred thermosetting binder is an epoxy resin, a curing agent capable of curing the epoxy resin at room temperature, and, alternatively, a halogen containing compound. The halogen containing compound can be the epoxy resin itself, or it can be an added organic compound. In order to obtain good fire retardant properties with essentially no after-burn, the surface coating composition of this invention must contain antimony trioxide as part of the colored sand coating and organically bound halogen, either as part of the colored sand coating or as part of the binder for the surface coating. Of course, organically bound halogen can also be present in both the sand coating and the binder.

By this invention antimony trioxide and insoluble halogen containing compounds can be incorporated into the surface coating compositions to impart fire retardant properties without destroying the desired multicolored effect. The binder which contains no dispersed opaque pigment (antimony trioxide) is clear and does not mask the color of the coated sand. Each particle of sand at the surface of the coating can be seen separately from the adjoining particles giving a pleasing varicolored textured appearance.

DESCRIPTION OF THE INVENTION

A. Color-Coated Sand Preparation

In preparing the free flowing color-coated sand useful in this invention, sand, pigment, and curable epoxy resin binder composition in an amount just sufficient to wet and coat the sand are mixed for a time sufficient to coat the sand and to cure the coating. Generally, the sand, pigment and curable binder are mixed in the amounts of about 35 to 70 weight percent sand, 25 to 50 weight percent pigments and 5 to 15 weight percent curable epoxy resin composition. Generally, at least about 10 weight percent of the pigment is antimony trioxide and up to all of the pigment, i.e., 100 weight percent, can be antimony trioxide. In addition to the antimony trioxide, a portion of the pigment (0 to 90 weight percent) can be a finely divided insoluble halogen containing resin. A particularly preferred composition contains about 50 to 65 weight percent sand, 5 to 10 weight percent antimony trioxide, 5 to 10 weight percent finely divided polyvinyl chloride resin and 5 to 10 weight percent curable epoxy resin composition with the remainder being pigments other than antimony trioxide and insoluble halogen containing resin. Another preferred composition contains 40 to 50 weight percent sand, 30 to 40 weight percent antimony trioxide and 5 to 10 weight percent curable epoxy resin composition with the remainder being pigments other than antimony trioxide and insoluble halogen containing resin. When the components are used in the above described proportions and are continuously mixed and tumbled prior to gelation and curing of the epoxy resin, each particle of sand becomes coated with the pigmented resin, the particles do not agglomerate and the sand remains free-flowing.

Sand is the primary material used in this invention. However, several other types of particles can be used in place of sand and are recognized as functional equivalents thereof. Included are siliceous materials, crushed rock, finely divided quartz and the like. The useful particle size of the sand ranges from about 3 to 325 mesh (U.S. Standard Sieve) with the preferred range being about 6 to about 100 mesh.

The curable epoxide resin composition used in this invention are curable mixtures of epoxide resins and epoxide resin curing agents. Epoxide resins are well known compositions which contain more than one 1,2 epoxy group per molecule. These resins include glycidyl polyethers of polyhydric phenols and polyhydric alcohols prepared by reacting the phenol or alcohol with a halohydrin and an alkali. Examples of suitable polyhydric phenols are hydroquinone, resorcinol, 1,5-dihydroxy-naphthalene, p,p'-dihydroxydiphenyl propane (bisphenol A), bis(4-hydroxyphenyl) ethane, novolak resins made by reacting a phenol with an aldehyde, and the like. Examples of polyhydric alcohols are ethylene glycol, propylene glycol, butylene glycol, glycerol, trimethylol propane, pentaerythritol, etc. The glycidyl ethers can be monomeric or polymeric depending upon the ratio of phenol or alcohol to chlorohydrin used in the initial reaction.

Other epoxide resins are glycidyl esters of polycarboxylic acids, such as diglycidyl phthalate, diglycidyl adipate, diglycidyl azelate, glycidyl esters of dimer and trimer acids, and the like. Also included are epoxide resins made by the epoxidation of unsaturated compounds. Such resins include epoxidized soybean oil, epoxidized linseed oil, 3,4-epoxy-cyclohexylmethyl-3,4-epoxy-cyclohexane carboxylate and vinyl cyclohexane diepoxide. The preferred epoxide resins are the glycidyl ethers of polyhydric phenols and polyhydric alcohols. The most preferred are glycidyl ethers having viscosities of less than 20,000 cps at 25°C, and particularly the diglycidyl ether of bisphenol A.

Other useful epoxide resins are halogenated epoxide resins such as the glycidyl ethers of halogenated polyphenols. Examples of such glycidyl ethers are diglycidyl ethers of tetrachloro-bisphenol A and tetrabromo-bisphenol A, polyglycidyl ethers of chlorinated and brominated novolak resins. Suitable epoxide resins are those which contain up to about 50 weight percent based on the weight of resin of organically bound halogen.

Viscosity reducers and flexibilizers can also be used in admixture with the epoxy resins. Examples of these are monoglycidyl ethers of phenols and alcohols, such as butyl glycidyl ether, phenyl glycidyl ether, cresyl glycidyl ether and the like. Other modifiers include glycidyl esters of monocarboxylic acids, such as glycidyl acetate, glycidyl ester of versatic acid, etc., alkylene carbonates and the glycidyl ether of castor oil.

Epoxy resin curing agents useful in this invention are well known compositions and include amines, amides, amido-amines, acids, anhydrides, Lewis acids and mercaptans. The preferred curing agents are those which will react and cure the epoxy resin composition within a temperature range of about 0°F. to about 150°F. and more preferably from about 32°F. to about 100°F., and within a time of about 30 minutes to about 6 hours and preferably about 1 to about 3 hours. In other words the preferred epoxy resin compositions are curable at room temperature and have a 1 to 3 hour pot life. Examples of these curing agents are primary and secondary amines, polymercaptans and Lewis acids. Examples of amines include ethylene diamine, diethylene triamine, triethylene tetramine, tetraethylenepentamine, hexamethylene diamine, iminobispropylamine, aromatic amines, such as meta-phenylene diamine and methylene dianiline accelerated with salicylic acid, adducts of polyamines reacted in excess with epoxy resins, and amido-amines made by reacting polyamines with mono and polybasic fatty acids. Included with these curing agents are amines activated with phenols and other activators.

Other curing agents are polymercaptans which contain at least two active mercapto groups. Examples of suitable mercaptans are 2,2'-dimercaptodiethyl ether, 2,2'-dimercaptodipropyl ether, propanedithiol-1,2, ethanedithiol-1,2, butanedithiol-1,3, and adducts of these compounds with epoxy resins. Additional curing agents include boron trifluoride-amine complexes.

These and other useful epoxy resins and epoxy resin curing agents are described in "Epoxy Resins", by Lee and Neville, McGraw-Hill Book Company, Inc., (1957).

The curable epoxy resin compositions useful in this invention contain sufficient epoxy resin curing agent to cure the composition within the temperature and time state hereinbefore. Generally the epoxy resin and epoxy resin curing agent are used in such proportions that 0.5 to 1.5 equivalents of the curing agent are present for each epoxide group of the epoxy resin.

In carrying out the process of this invention it is preferred that the epoxide resin composition contain substantially no volatile solvent and that the composition be fluid at room temperature, i.e., that the viscosity be no higher than about 20,000 cps at 25°C. The preferred epoxide resin composition, i.e., the blend of epoxide resin, reactive diluent if any, curing agent, and activator if any, has a viscosity of less than 10,000 cps. at 25°C.

The primary pigment used in this invention is antimony trioxide. Antimony oxide was made available as a pigment about 1920 but has primarily been used as an additive for imparting fire retardance to paints, coatings and various compositions. Useful particle size for antimony trioxide is from about 0.1 micron to about 5 microns with the preferred size being from about 0.2 to 1.0 micron.

An additional pigment which can be used in admixture with antimony trioxide is a finely divided resin which contains organically bound halogen atoms and which is insoluble in the epoxy resin composition. Suitable resinous compositions are high molecular weight polyvinyl chloride, polyvinyl bromide, polyvinyl iodide, polyvinylidene chloride, polychlorotrifluorethylene, polytetrafluoroethylene, chlorinated and brominated vulcanized or crosslinked natural and synthetic rubbers, and the like. Halogen containing resins, useful as pigments, are high melting (softening points above about 75°C) and are fine white powders of such particle size that they will pass through a 100 mesh screen, and preferably through a 200 mesh screen.

Additional pigments that can be used are well known pigments and dyes which are used to impart the desired color to the coated sand. These pigments include titanium dioxide, carbon black, toluidine red, cadmium red, red iron oxide, brown iron oxide, black iron oxide, Hansa yellow, phthalocyanine blue, phthalocyanine green, aluminum powder, chrome yellow, etc.

The pigments can be dispersed in the epoxide resin itself by grinding in suitable equipment such as a ball or pebble mill, or by simply adding the finely divided pigment to the mixture of resin and sand. The pigments can also be predispersed in a portion of the epoxide resin or the curing agent, which can then be added to the epoxide resin composition and sand. The pigments can also be dispersed in other vehicles, such as dibutyl phthalate. Pigments which are formulated into paint colorants can also be used in this invention. Such colorants contain the pigment dispersed in a suitable vehicle which includes a surfactant.

Equipment which can be used to prepare the coated sand of this invention are well known mixers and agitators as described in "Encyclopedia of Chemical Technology" Vol. 9, p. 154–166, by Kirk & Othmer, Interscience Encyclopedia, Inc., New York (1952). Such equipment includes rotary dry-bath mixers or blenders, continuous centrifugal mixers, conical mixers, pan mixers, dispersion blade mixers, pug mills, roller mills, etc.

In preparing the coated sand of this invention, the epoxy resin, curing agent, pigment and sand are added to a suitable mixer in any order and mixing is begun. At first a heavy pasty mass forms, but when all the sand has been wetted by the resinous composition, the viscosity of the mass is somewhat reduced. The viscosity begins to increase as curing begins and reaches its highest viscosity just before the gel point. However, when the gel point is reached, the viscosity falls off and the mass takes on the characteristics of dry sand. Continuous mixing is required until after the coating has cured in order to prevent the sand from sticking together to form a lumpy mass.

B. Fire Retardant Multicolored Coating Preparation

The fire retardant multicolored coating compositions of this invention are prepared by blending the multicolor coated sand hereinbefore described with a clear thermosetting binder in the proportions of about 5–20 parts by weight of binder and 95–70 parts by weight of the coated sand. The clear thermosetting binder can contain from 0 to 50 weight percent organically bound halogen atoms. The total coating composition, i.e., the binder and the coated sand, will contain from about 2 to about 15 weight percent organically bound halogen atoms and about 1.5 to about 35 weight percent antimony trioxide.

The clear thermosetting binder useful in this invention is any resinous composition which is a film former and which will cure to a thermoset state. Examples of such binders include drying oil and semi-drying oil modified alkyd resins, epoxy esters, unsaturated polyesters in admixture with a vinyl monomer, urethane resins, epoxide resins and the like. Preferred binders are epoxy resin compositions with the most preferred being epoxide resin compositions which cure at room temperature. Such epoxide resins have been described in detail, hereinbefore, in the discussion of the colored sand. Such epoxide resin compositions are also useful in this part of the invention. Included among the useful epoxide resin compositions are halogenated epoxide resins, hereinbefore described.

A halogenated thermoplastic composition can be added to the clear thermosetting binder in order to obtain organically bound halogen atoms in the binder. Such halogenated compositions must be soluble in or miscible with the binder in order that the binder remain clear. Examples of such compositions are chlorinated and brominated biphenyls and polyphenyls, chlorinated paraffins and chlorinated, brominated and iodinated waxes.

The mixture of color-coated sand and clear thermosetting binder can be spread over the desired substrate to a thickness sufficient to hide the substrate, generally at a thickness of about ⅛ to about ⅜ inch. The preferred method of applying the coating is by trowelling. The coatings can be cured at room temperature or can be heated by suitable means, e.g., infra-red lamps, to accelerate the cure. The resulting cured coatings are not only decorative, but protect the substrate, are fire retardant and are skid resistant.

The following examples describe the invention in more detail. Parts and percentages where used are parts and percentages by weight.

EXAMPLE 1

To a suitable mixer which mixes by blending and tumbling were added 60.78 parts of white silica sand having a sieve analysis (U.S. Sieve Series) as follows:

| U.S. Sieve No. | % Passing |
| --- | --- |
| 16 | 100 |
| 20 | 85–95 |
| 30 | 10–30 |
| 50 | 0–5 |

The mixer was started and to it was added a previously prepared mixture of 6.12 parts of epoxy resin and 1.21 parts of curing agent. The epoxy resin was a diglycidyl ether of bisphenol A containing 11 weight percent butyl glycidyl ether and having a viscosity at 25°C. of 600 cps. and an epoxide equivalent weight of 185. The curing agent was a solution of 66.7 weight percent diethylene triamine and 33.3 weight percent bisphenol A. After thorough mixing, 7.97 parts of antimony trioxide pigment, 7.97 parts of polyvinyl chloride resin having a chlorine content of 64 weight percent and a particle size such that all of it passes through a 200 mesh screen (U.S. Sieve Series), and 15.95 parts of red iron oxide pigment were added. Mixing and tumbling were continued for one additional hour. At the end of this time the sand was coated with a red, dry, cured coating and it was completely free flowing.

EXAMPLE 2

Using the same procedure as described in Example 1, a white colored sand was produced by substituting titanium dioxide for the red iron oxide while keeping the other component the same. As in Example 1, a free flowing coated sand was produced.

EXAMPLE 3

A floor coating composition was prepared by mixing, in an appropriate container, 4.43 parts of the diglycidyl ether of bisphenol A having an epoxide equivalent weight of 190 and a viscosity at 25°C. of 13,000 cps., 0.49 part of an aliphatic polyglycidyl ether having an epoxide equivalent weight of 600 and a viscosity at 25°C. of 350 cps., 0.12 part of an antisettling agent (polyethylene wax), and 1.29 parts of an amidoamine curing agent having a viscosity at 25°C. of 600 cps. and an amine hydrogen equivalent weight of 65. To this mixture were added 49.9 parts of the coated sand of Example 1, 33.15 parts of the coated sand of Example 2, and 10.62 parts of solid glass spheres having a particle size smaller than 325 mesh (U.S. Standard Sieve).

The above coating composition was applied at a thickness of ¼ to 5/16 inch to duplicate sets of 6 × 6 × ⅛ inches sandblasted steel panels primed with an epoxy resin-amidoamine primer. A sealer coat similar to the primer coat was then applied to each panel and the panels were cured for one week at room temperature.

Fire retardancy tests were carried out on the cured coated panels by subjecting the panels to a direct open blast flame from four Fisher burners located side-by-side for a period of 240 seconds. Upon removal of the open flame, the coating exhibited an "after burn" time of 0 seconds. Similar results were obtained when the coating composition was applied as previously described to a specimen holder consisting of a ¼ inch thick mild steel plate 31.5 inches long and 7 inches wide with longitudinal flanges.

EXAMPLE 4

A floor coating composition was prepared, applied and cured exactly as described in Example 3 except red colored quartz and white colored quartz were substituted for the coated sands. When fire retardancy tests were conducted on the cured coating using the same procedure as described in Example 3, "after-burn" times between 15 and 200 seconds were obtained.

EXAMPLE 5

To the mixer described in Example 1 were added 44.05 parts of white silica sand having a particle size as follows:

| U.S. Sieve No. | % Retained |
|---|---|
| 20 | 26 ± 7 |
| 30 | 60 ± 8 |
| 45 | 12 ± 5 |
| 50 | 2 max |

The mixer was started and a previously prepared mixture of 5.64 parts of the diglycidyl ether of bisphenol A (epoxide equivalent weight of 190 and viscosity at 25°C of 13,000 cps.) and 1.44 parts of an amidoamine (amine hydrogn equivalent weight of 65 and viscosity at 25°C of 600 cps.) were added. After thorough mixing, 35.96 parts of antimony trioxide pigment and 12.91 parts of titanium dioxide pigment were added. Mixing was then continued until a white, dry, cured, free flowing coated sand resulted.

EXAMPLE 6

Using the same procedure as described in Example 5, a red colored sand was produced by substituting red iron oxide for the titanium dioxide.

EXAMPLE 7

A coating composition was prepared by mixing 4.43 parts of the diglycidyl ether of bisphenol A described in Example 3, 0.49 part of the aliphatic polyglycidyl ether described in Example E, 1.29 parts of amidoamine curing agent described in Example 3, 0.12 part of the same antisettling agent of Example 3, and 6.50 parts of a solution of chlorinated biphenyl at 80 percent solids in toluene. To this mixture were added 49.90 parts of the coated sand described in Example 6, 33.15 parts of the coated sand described in Example 5 and 4.12 parts of the glass spheres described in Example 3.

The above coating composition was applied to steel panels, cured and subjected to a flame retardancy test using the procedure described in Example 3. The "after burn" time after removal of the flames was zero seconds.

An identical coating was prepared except red and white colored quartz (described in Example 4) were substituted for the red and white coated sand. Coated panels were prepared, cured and tested for flame retardancy as described above. These panels exhibited "after burn" times of 92 seconds.

EXAMPLE 8

A coating composition was prepared by mixing 5.74 parts of a solution —80 percent solids in methyl ethyl ketone — of the diglycidyl ether of tetrabromo bisphenol A having an epoxide equivalent weight of 400, 4.59 parts of the diglycidyl ether of bisphenol A — butyl glycidyl ether mixture described in Example 1, and 1.19 parts of the amine curing agent described in Example 1. To this mixture were added 49.90 parts of the coated sand described in Example 6, 33.15 parts of the coated sand described in Example 5 and 5.43 parts of the glass spheres described in Example 3.

The above coating composition was applied to steel panels, cured and subjected to a flame retardancy test using the procedure described in Example 3. The "after burn" time after removal of the flames was zero seconds.

A similar coating was prepared wherein red and white colored quartz particles were substitued for the coated sand. The "after burn" time of this coating was found to be 28 seconds.

It is understood that the foregoing detailed description is given merely by way of illustration and that many variations can be made therein without departing from the spirit of this invention.

The embodiments of this invention in which an exclusive privilege or property is claimed are:

1. A fire-retardant, multicolored coating composition comprising color-coated sand and clear thermosetting binder in the amount of 5–20 parts by weight of binder and 95–70 parts by weight of color coated sand wherein
   a. said color-coated sand comprises individual sand particles coated with pigments and a cured epoxy resin composition, the sand, pigments, and cured epoxy resin composition being in the amount of
      i. 35–70 weight percent sand,
      ii. 25–50 weight percent pigments, and
      iii. 5–15 weight percent cured epoxy resin composition,
   wherein 10 to 100 weight percent of the pigment is antimony trioxide, 0–90 weight percent of the pigment is finely divided insoluble halogen containing resin, and the cured epoxy resin composition contains 0–50 weight percent, based on the weight of the epoxy resin composition, organically bound halogen atoms,
   b. said binder contains 0 to 50 weight percent organically bound halogen atoms, and
   c. based on the total weight, said coating composition contains 2 to 15 weight percent organically bound halogen atoms and 1.5 to 35 weight percent antimony trioxide.

2. The coating composition of claim 1 wherein the clear thermosetting binder is a room temperature curable epoxy resin composition.

3. The composition of claim 2 wherein the room temperature curable epoxy resin composition is a blend of a glycidyl polyether of a polyhydric phenol and an amine hydrogen containing curing agent.

4. The composition of claim 3 wherein the polyhydric phenol is a halogenated polyhydric phenol.

* * * * *